Patented Dec. 18, 1945

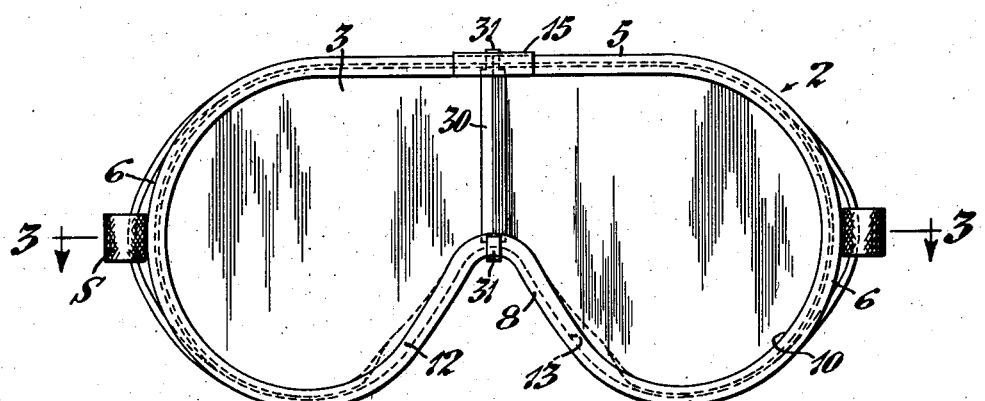
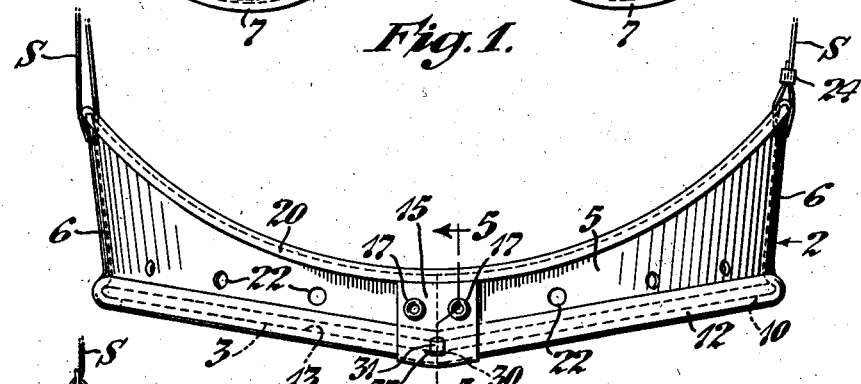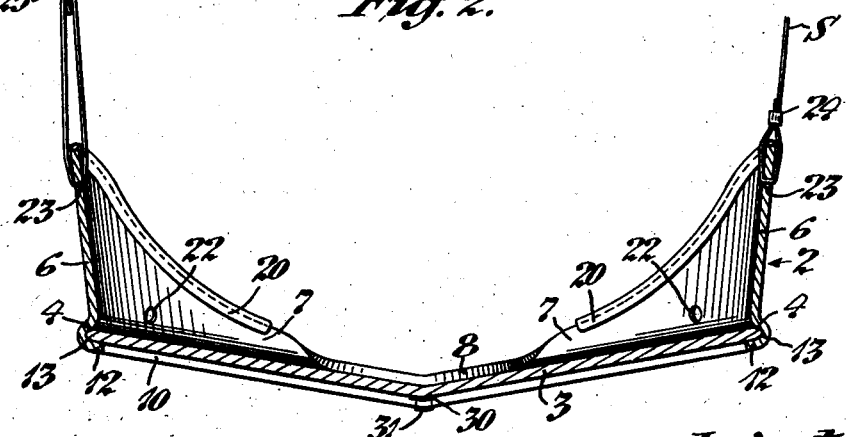

2,391,349

UNITED STATES PATENT OFFICE 2,391,349

GOGGLE

Ernest A. Ring, West Barrington, R. I., assignor of one-half to Francis M. Blakeney, Cranston, R. I.

Application November 17, 1943, Serial No. 510,653

3 Claims. (Cl. 2—14)

This invention relates to goggles for protecting the eyes of the wearer, being particularly adapted for use by workers in industrial plants such as machinists, foundrymen, chippers, welders, stone-cutters and other artisans exposed to flying sparks, metal chips or particles thrown from grinding and polishing wheels.

One object of the invention is to provide a sturdy, shock-proof goggle affording maximum protection to the eyes from all angles without obstructing the range of vision in any direction.

Another object is to provide a light-weight, comfortable goggle which will not cause abrasion, irritation or discoloration of the skin of the wearer while also allowing adequate ventilation.

Another object is to provide a goggle which may be worn over prescription glasses without interfering therewith or affecting the optical characteristics thereof.

Another object is to provide a goggle having an improved lens which is free from optical defects, non-glaring, non-fogging, resistant to scratching, and proof against shattering and splintering during continued use under severe exposure to flying particles of metal and abrasives.

Another object of the invention is to provide a goggle having a frame constructed from a single strip of transparent, semi-flexible plastic material cut or died-out from sheet-stock and folded to substantially double ovate-orbicular shape with the ends of the strip connected together.

Another object of the invention is to provide a goggle having a one-piece frame formed with a lens-opening of double ovate-orbicular contour with a groove surrounding said opening for receiving a lens of corresponding outline.

Another object of the invention is to provide a goggle in which the one-piece frame is capable of being sprung apart to expand the lens-opening in several directions whereby to release the lens from the groove for convenient removal and replacement thereof.

Further objects of the invention are set forth in the following specification which describes a preferred form of construction of the improved goggle as illustrated by the accompanying drawings. In the drawings:

Fig. 1 is a front elevational view of a goggle embodying the present invention;

Fig. 2 is a plan view of the same;

Fig. 3 is a sectional plan view of the goggle taken on line 3—3 of Fig. 1;

Figure 4:
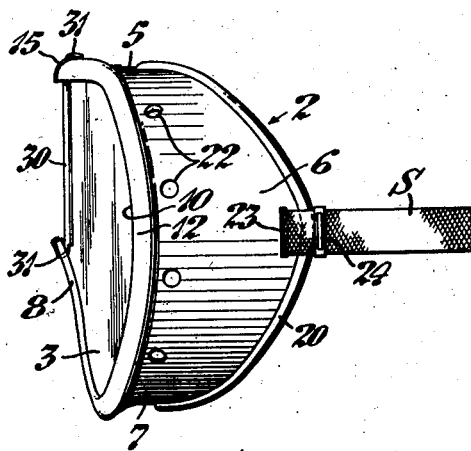
Fig. 4 is a side elevational view of the goggle.

Referring to the drawings, the present goggle comprises a one-piece frame 2 constructed from suitable plastic material in sheet form, preferably of transparent cellulose acetate, and adapted to mount a replaceable, one-piece lens 3. The lens 3 may be of glass, but preferably it is constructed from methyl methacrylate or the material known in the trade as "Plexiglas" which is substantially non-fogging, clear and non-distorting, resistant to scratching and not liable to shatter and splinter under impact by heavy particles of metal or abrasives.

Figure 5:
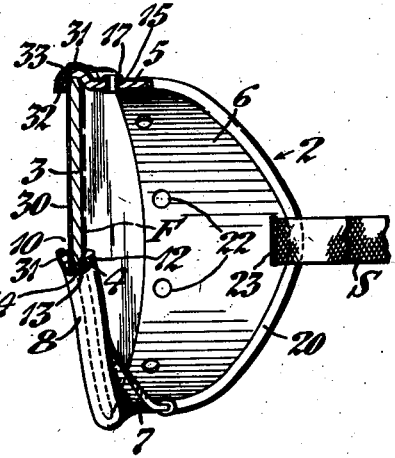
Fig. 5 is a sectional view of the goggle taken on line 5—5 of Fig. 2.

As herein illustrated, the frame 2 of the goggle is constructed from a single strip of the plastic material folded upwardly with its ends meeting to form a substantially flat top wall 5 and having cylindrical wings 6 at the sides surrounding arcuate grooved portions 7 which blend into a reentrant loop or arch at the bottom and center of the frame, thus providing a nose-piece or bridge 8. The arcuate portions 7, nose-piece 8 and top wall 5 thus constitute the marginal rim of the lens-opening 10 of double ovate-orbicular contour for receiving the lens 3 which is of corresponding outline. The rearward edge of the top wall 5 of the frame 2 is of substantially bow-shape or curved to conform to the forehead of the wearer and its forward edge extends at opposite angles with the apex at the center, see Fig. 2. The bottom rim of the lens-opening 10, constituted by the arcuate portions 7 and arched nose-piece 8, is of substantially the same bow-shape in plan view as that of the top wall 5, see Fig. 3. As shown in Figs. 3 and 5, the continuous rim of the lens-opening 10 is provided with a flange 12 folded or curled around to form a groove 13 for the lens 3 and its convex surface presents a smooth contour for the bridge 8 whereof to avoid a rough edge liable to abrade the nose of the wearer.

The single lens 3 is constructed from a sheet of transparent material, preferably "Plexiglas," cut or died out with its marginal edge of a contour corresponding to that of the opening 10 in the frame 2. The two substantially ovate lateral panels of the lens are bent rearwardly on a median line to cause them to stand at divergent angles; this construction providing unobstructed clear vision and preventing glare. The edges of the lens 3 may be beveled as indicated at 4 in Figs. 3, 5 and 6 to adapt them to fit snugly within the continuous groove 13 while facilitating the insertion of the lens into or its removal from the frame.

As before stated, the frame 2 of the goggle is constructed from a single strip of the plastic material. The strip may be cut or died out from sheet-stock and formed under heat and pressure with the groove 13 in the marginal rim of the lens-opening 10. The heated blank is folded over a form to shape it to the contour shown in the drawings and then permitted to cool to temper the stock and cause it to maintain the shape to which it is folded. The ends of the folded blank abut at the top and may be connected together by any suitable means. As herein shown, the ends of the blank are fastened together by means of a thin sheet-metal plate or connector 15 overlying the seam between the edges of the blank, see Figs. 2 and 5. Adjacent the ends of the blank the stock is perforated to receive hollow rivets 17 which pass through holes in the connector-plate 15, the ends of the rivets being headed over to secure the parts permanently together. As shown in Fig. 5, the forward edge of the connector-plate 15 is shaped to overlie the grooved flange 12 at the top of the frame.

Preferably, the continuous rearward edge bordering the top wall of the frame 2 and the wings 6 is enclosed by a narrow channeled strip 20 of the plastic material bent therearound and cemented thereto to provide a smooth convex surface for contact with the forehead and cheeks of the wearer. A series of holes 22 may be punched through the top and side wings of the goggle-frame 2 to provide ventilation.

An elastic band or strap S is employed for encircling the head to hold the goggle against the face of the wearer. As shown in Figs. 3 and 4, one end of the elastic band S passes through a slit 23 in one side wing 6 of the frame 2 with its terminal portion bent back upon itself and fastened by a metal clip 24. The opposite end of the band S also extends through a slit 23 in the other wing 6 with its terminal portion adjustably secured to the main portion of the band by a slidable buckle or connector 25, see Fig. 3, whereby the length of the band may be adjusted to effect a snug fit of the goggle against the face of the wearer.

Figure 6:
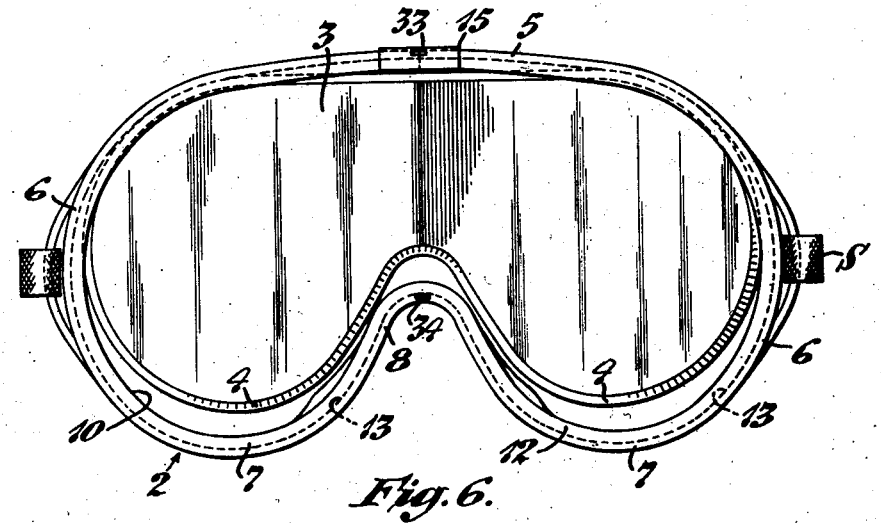
Fig. 6 is a front elevational view of the goggle-frame showing it as sprung apart to expand the lens-opening in several directions to permit the lens to be inserted thereinto or removed therefrom.

It has been stated that the frame 2 of the goggle is constructed of plastic material and preferably the material is of such characteristics as to provide sufficient resiliency to adapt portions of the frame to be sprung apart or spread open in the manner illustrated in Fig. 6 of the drawings for inserting the lens 3 into the frame with its beveled edges 4 engaging in the groove 13 surrounding the lens-opening 10. It will be particularly noted by reference to Fig. 6 that the frame 2 is spread open by drawing its top wall 5 and bottom rim 7, 8 apart. Due to the double-loop contour of the frame 2, as its top and bottom portions are spread apart the angular arch forming the nose-piece 8 will become more obtuse and the ovate-orbicular shaped portions thus will be expanded. That is to say, the size of the lens-opening 10 will be substantially increased to permit the lens 3 to be assembled in place in the frame 2. The upper edge of the lens 3 is first inserted in the groove 13 formed in the top wall 5 of the frame 2 and its lower curved portions alined with the continuation of the groove formed in the bttom rim 7 and nose-piece 8. The frame 2 is then released and due to the inherent resiliency of the material the top, bottom and side portions of the lens-opening will be drawn inwardly to contract the frame to its normal shape and size and fixedly engage the edges of the lens 3 in the continuous groove 13 thereof. The lens 3 thus is firmly held in the frame to prevent its accidental displacement.

To provide for extreme rigidity and sturdiness of the goggle-frame I may attach a central metal strut or stay 30 to its top and bottom portions 5 and 7 extending therebetween, see Figs. 1, 4 and 5. The stay 30 may consist of a strip of metal slightly bowed or crowned on its forward face to present a finished appearance and positioned to overlie the apex of the angle formed by the faces of the lens 3, see Fig. 3. The strut or stay 30 preferably has narrow flexible extensions or tabs 31 at its opposite ends, the upper one of which is inserted through alined slits 32 and 33 in the flange 12 on the top wall 5 of the frame 2 and the connector-plate 15, respectively, and then bent rearwardly as shown in Fig. 5; while the tab 31 at the lower end of the stay is similarly fastened by inserting it through a slit 34 in the flange of the nose-piece 8 and bending it upwardly as also shown in Fig. 5.

When it is desired to remove the lens 3 from the goggle-frame 2 the metal stay 30 may first be disconnected therefrom by bending back its tabs 31 with the fingers to release them from the slits 32, 33 and 34. Thereafter, the top and bottom portions of the frame 2 may be spread apart as shown in Fig. 6 to cause the lens-opening 10 to be expanded against the inherent resiliency of the material in the manner previously explained. The lens 3 then may be dismounted from the frame 2 by first displacing its lower curved edges laterally from the bottom rim 7 and drawing it downwardly from the opening 10.

The goggle may be adapted for use as sunglasses or, in other cases, for shielding the eyes in welding with an acetylene torch, by applying colored filters at the rear of the lens 3 as indicated by dash-lines at F in Fig. 5. For example, a strip of thin transparent filter-material cut to the outline of the lens may be placed against its rearward face with its edges inserted in the continuous groove 13.

It will be observed from the foregoing specification that my invention provides a lightweight, sturdy and shockproof goggle, particularly adapted to give maximum protection to the eyes of the wearer. The frame of the goggle, being constructed from transparent material, affords a wide range of vision and the lens constructed from material known by the trade-name "Plexiglas" is non-fogging and non-distorting while offering maximum resistance to scratching, shattering or splintering under impact. The angular relationship of the sides of the lens at the front of the frame, similar to the arrangement of the glass in split windshields of automobiles, has the effect to minimize glare from reflection of light rays.

The frame of the goggle being constructed from resilient material provides for spreading its lens-holding portions apart for convenient removal and replacement of the lens, while at the same time effecting a firm and secure mounting for the lens to prevent looseness or vibration.

The frame of the goggle being light in weight with its edges of rounded contour for contact with the face renders the goggle more comfortable to wear while still providing maximum protection to the eyes.

The plastic goggle-frame may be stamped out from a single strip of sheet-stock in the form of a blank and shaped under pressure and heat with its ends joined together whereby to render the article economical to manufacture.

While the invention is herein shown as embodied in a goggle having its frame constructed from a single strip folded to the desired shape, it is to be understood that modifications may be made in its structure without departing from the spirit or scope of the invention. Therefore, without limiting myself in this respect, I claim:

1. A goggle comprising a frame constructed from a strip of transparent flexible sheet-material folded into curvilinear form to provide a flat top wall, curved side and bottom walls and an upstanding bridge-portion with the ends of the strip meeting at the top of the frame and a lens-opening of double ovate-orbicular outline at the front thereof, said walls of the frame having their rearward edges shaped to conform to the contour of the face of the wearer, a continuous concavo-convex flange forming a groove surrounding the lens-opening, a lens having an outline conforming to that of the lens-opening, said frame being expandible in several directions to permit the lens to be mounted in its groove and contractible to retain it in place, a sheet-metal connector-plate joining the ends of the plastic strip and formed with a curved portion overlying the flange on the frame, and a metal stay having one end looped through openings in the flange and connector-plate and its opposite end looped through an opening in the bridge-portion of the frame.

2. A goggle comprising a hollow frame constructed from a strip of transparent flexible sheet-material folded around in looped formation with the terminal portions of the strip meeting at the top and with its rearward edges shaped to conform to the contour of the face of the wearer, means for fastening the meeting edges of the strip in permanent connection, said frame being formed with a top wall, curved side and bottom walls and an upstanding bridge portion enclosing an opening at the front of double ovate-orbicular contour with a continuous groove surrounding said opening, a lens of transparent material having an outline conforming to the contour of said opening in the frame and bent at the center on a vertical line with the lateral portions of the lens extending rearwardly in angular relationship, the flexible material adapting the frame to be expanded in several directions by springing its top and bottom portions apart to permit the edges of the lens to be inserted in the groove surrounding the opening, and a rigid stay extending between the top portion and the bridge of the frame to normally prevent expansion thereof, said stay being manually detachable to permit expansion of the frame for removal and replacement of the lens.

3. A goggle comprising a frame constructed from a strip of transparent flexible sheet-material folded into curvilinear form to provide a flat top wall, curved side and bottom walls and an upstanding bridge portion at the center with the ends of the strip meeting and permanently secured together, said frame having a lens-opening of double ovate-orbicular outline at the front with a continuous concavo-convex flange forming a groove surrounding the lens-opening, a lens having an outline conforming to that of the lens-opening in the frame, said frame being expandible in several directions to permit the lens to be mounted in the groove surrounding the opening and contractible to retain the lens in place, and a rigid stay extending vertically across the center of the lens and having its ends releasably attached to the top of the frame and its bridge-portion whereby to adapt it to be removed to permit expansion of the frame for removal of the lens.

ERNEST A. RING.